(12) United States Patent
Xia et al.

(10) Patent No.: US 11,541,456 B2
(45) Date of Patent: Jan. 3, 2023

(54) FECRCUTIV HIGH-ENTROPY ALLOY POWDER FOR LASER MELTING DEPOSITION MANUFACTURING AND PREPARATION METHOD THEREOF

(71) Applicant: SOOCHOW UNIVERSITY, Jiangsu (CN)

(72) Inventors: Zhixin Xia, Suzhou (CN); Wenjuan Jiang, Suzhou (CN); Tuo Shi, Suzhou (CN); Lei Chen, Suzhou (CN); Jiachao Xu, Suzhou (CN)

(73) Assignee: SOOCHOW UNIVERSITY, Jiangsu (CN)

( * ) Notice: Subject to any disclaimer, the term of this patent is extended or adjusted under 35 U.S.C. 154(b) by 0 days.

(21) Appl. No.: 16/955,355

(22) PCT Filed: Apr. 22, 2019

(86) PCT No.: PCT/CN2019/083676
§ 371 (c)(1),
(2) Date: Jun. 18, 2020

(87) PCT Pub. No.: WO2020/206724
PCT Pub. Date: Oct. 15, 2020

(65) Prior Publication Data
US 2022/0016705 A1    Jan. 20, 2022

(30) Foreign Application Priority Data
Apr. 12, 2019    (CN) .................. 201910292645.X

(51) Int. Cl.
*B22F 9/08*    (2006.01)
*C22C 30/02*   (2006.01)
(Continued)

(52) U.S. Cl.
CPC .............. *B22F 9/082* (2013.01); *B33Y 40/10* (2020.01); *B33Y 70/00* (2014.12); *C22C 30/02* (2013.01); *B22F 2009/0848* (2013.01)

(58) Field of Classification Search
CPC .............. C22C 30/02; B22F 9/06–9/14; B22F 2009/0848
See application file for complete search history.

(56) References Cited

U.S. PATENT DOCUMENTS 8,075,661 B2    12/2011    Chen et al.
2009/0074604 A1    3/2009    Chen et al.
(Continued)

FOREIGN PATENT DOCUMENTS

CN    101418394 A    4/2009
CN    102899664 A    1/2013
(Continued)

OTHER PUBLICATIONS

CN107740093A English language translation (Year: 2018).*

*Primary Examiner* — Sally A Merkling
*Assistant Examiner* — Sean P. O'Keefe
(74) *Attorney, Agent, or Firm* — Schmeiser, Olsen & Watts, LLP

(57) ABSTRACT

Provided is a FeCrCuTiV high-entropy alloy powder for laser melting deposition manufacturing and a preparation method thereof, in percent by weight, the composition of the high-entropy alloy powder is: chromium 17-20%; copper 22-25%; titanium 16-19%; vanadium 17-20%; and ferrum 19-22%, wherein by utilizing the solid solution effect of alloying elements such as Ti, V and Cu of the high-entropy alloy, it can effectively alleviate the differences in thermal expansion coefficient, melting point, elastic modulus, etc. of the tungsten/steel or tungsten/copper heterogeneous interface, can reduce the residual stress level at the heterogeneous interface during the laser melting deposition manu- (Continued)

facturing process and avoid the precipitation of Laves phase, and can meet the manufacturing requirements of tungsten/steel and tungsten/copper heterogeneous components for fusion reactors.

4 Claims, 3 Drawing Sheets

(51) Int. Cl.
*B33Y 70/00* (2020.01)
*B33Y 40/10* (2020.01)

(56) References Cited

U.S. PATENT DOCUMENTS

| | | | |
|---|---|---|---|
| 2017/0314097 A1 | 11/2017 | Hong et al. | |
| 2018/0363104 A1* | 12/2018 | Fujieda | B22F 9/08 |
| 2019/0047049 A1* | 2/2019 | Fujieda | C22C 19/056 |
| 2020/0158123 A1* | 5/2020 | Chen | B22F 10/20 |
| 2020/0290118 A1* | 9/2020 | Chen | C22F 1/10 |

FOREIGN PATENT DOCUMENTS

| | | |
|---|---|---|
| CN | 103194656 A | 7/2013 |
| CN | 103757661 A | 4/2014 |
| CN | 107488804 A | 12/2017 |
| CN | 107740093 A | 2/2018 |
| CN | 108356263 A | 8/2018 |
| CN | 109252083 A | 1/2019 |
| JP | 2002173732 A | 6/2002 |
| JP | 4190720 B2 | 9/2008 |
| JP | 2009074173 A | 4/2009 |
| KR | 20090030198 A | 3/2009 |
| KR | 100976731 B1 | 8/2010 |
| TW | I347978 B | 9/1996 |
| TW | 200914628 A | 4/2009 |

* cited by examiner

FECRCUTIV HIGH-ENTROPY ALLOY POWDER FOR LASER MELTING DEPOSITION MANUFACTURING AND PREPARATION METHOD THEREOF

CROSS-REFERENCE TO RELATED APPLICATIONS

This application claims priority to PCT Application No. PCT/CN2019/083676, having a filing date of Apr. 22, 2019, which is based on Chinese Application No. 201910292645.X, having a filing date of Apr. 12, 2019, the entire contents both of which are hereby incorporated by reference.

FIELD OF TECHNOLOGY

The following relates to a FeCrCuTiV high-entropy alloy powder for laser melting deposition manufacturing and a preparation method thereof, in particular to a FeCrCuTiV high-entropy alloy powder for laser melting deposition manufacturing suitable for heterogeneous components such as tungsten/steel and tungsten/Copper for fusion reactors and the preparation method thereof.

BACKGROUND

Plasma facing components (PFCs) play a key role in fusion reactors, suffer from severe conditions such as periodic thermal loads and neutron irradiation, and require safety and reliability and long life. Metal tungsten and its alloys have been used as candidates for plasma facing components in nuclear fusion reactors due to a series of excellent properties, and metal copper and low-activated steel are candidate heat sink materials. It is desirable to develop tungsten steel PFC components with complex flow channel structures for fusion reactor devices. At present, tungsten/steel and tungsten/copper heterogeneous components with complex flow channel structures are generally prepared by casting or welding assembly methods, but for certain varied cross-section flow channels with extraordinary complex shapes, they are difficult to produce by casting and welding, and the performance of the casting structures is poor. And meanwhile, due to the large difference in physical properties between tungsten and copper or between tungsten and steel, a large residual stress is easy to generate at the welding heterogeneous interface, and the weld seam structure inevitably forms a thick Laves phase, which seriously affects the performance of the joint. The traditional manufacturing process cannot produce high-quality high-performance tungsten steel heterogeneous alloy components with complex flow channel structures, and due to that laser additive manufacturing can achieve highly flexible processing of the fine structure of heterogeneous materials on the surface of complex components, it is proposed to use laser additive manufacturing method to prepare tungsten/steel and tungsten/copper heterogeneous components.

Laser melting deposition technology has development potential in the manufacture of tungsten/steel components with complex flow channel structures, but due to the combined action of the residual stress caused by the difference in physical properties of tungsten/steel or tungsten/copper and the FeW hard and brittle phase formed by mass transfer and diffusion, it is likely to cause cracking at tungsten/steel or tungsten/copper heterogeneous interface. Therefore, how to choose and design a suitable composition system as the transition layer is the current direction of exploration, and the high-entropy alloy is a multi-component solid solution with stable structure and excellent comprehensive performance, which has good application prospects in the field of engineering materials. CN201710658129 discloses a CrMnFeVTi high-entropy alloy with ultra-high strength and hardness and corrosion-resistant, CN201811317268 discloses a multi-phase high-entropy alloy, and at present, domestic and foreign scholars have successfully prepared high-entropy alloy system solid solution such as Fe and W containing $CoCrNiFeW_{1-x}Mo_x$ and FeWNiCuMo series through powder metallurgy. However, due to the characteristics of the laser additive manufacturing process and the difficulty of combining heterogeneous components such as tungsten/steel and tungsten/copper, the current alloy powder still cannot meet its process requirements, and the manufacturing requirements for low activation performance in nuclear fusion devices require, and it is required to further design and study the composition optimization of high-entropy alloy powder used in laser additive manufacturing.

SUMMARY

An aspect relates to a FeCrCuTiV high-entropy alloy powder for laser melting deposition manufacturing to meet the manufacturing requirements of tungsten/steel and tungsten/copper heterogeneous components for fusion reactors.

To achieve the above purpose, the technical solution of the present disclosure is: a FeCrCuTiV high-entropy alloy powder for laser melting deposition manufacturing, in percent by weight, the composition of the high-entropy alloy powder is:

| | |
|---|---|
| chromium | 17-20%; |
| copper | 22-25%; |
| titanium | 16-19%; |
| vanadium | 17-20%; |
| ferrum | 19-22%. |

As a preferred implementation, in percent by weight, the high-entropy alloy powder is prepared from chromium 19.2%, copper 22.3%, titanium 17.7%, vanadium 19.0%, and ferrum 21.8%.

As another preferred implementation, in percent by weight, the high-entropy alloy powder is prepared from chromium 17.8%, copper 24.8%, titanium 18.7%, vanadium 19.4%, and ferrum 19.3%.

Preferably, the particle size of the high-entropy alloy powder is 100 mesh-350 mesh.

The present disclosure is aimed at providing a preparation method for the above-mentioned FeCrCuTiV high-entropy alloy powder for laser melting deposition manufacturing.

To achieve the above purpose, the technical solution adopted by the present disclosure is: a preparation method for the above-mentioned FeCrCuTiV high-entropy alloy powder for laser melting deposition manufacturing, wherein it comprises following steps:

(1) Preparing raw materials: preparing metal ferrum, metal chromium, metal copper, metal titanium and metal vanadium according to a target composition;

(2) Melting: adding the prepared metal ferrum, metal chromium, metal copper, metal titanium, and metal vanadium to a medium frequency induction furnace, electrified heating them to melt, and discharging after adjusting the composition in the medium frequency induction furnace to be qualified;

(3) Vacuum atomization: atomizing the alloy solution obtained in Step (2), wherein the atomizing medium is argon;

(4) Drying: drying the alloy powder obtained by atomization in Step (3);

(5) Screening: screening the alloy powder obtained by drying in Step by a screening machine to screen out the alloy powder with a required particle size range, that is, the desired FeCrCuTiV high-entropy alloy powder.

Preferably, in Step (2), discharging temperature of the alloy solution is 1450° C.-1500° C.

Preferably, during the melting process in Step (2), a part of the raw materials is added to the medium frequency induction furnace for melting first, and rest of the raw materials is added as a supplement to the alloy solution successively.

Further, when adding the supplement into the medium frequency induction furnace, temperature inside the medium frequency induction furnace is controlled between 1500° C.-1550° C.

Preferably, in Step (2), atomizing pressure is 2-10 MPa.

Preferably, in Step (4), a far infrared dryer is used for the drying, and drying temperature is 200-250° C.

Due to the use of the above technical solutions, the present disclosure has the following advantages over the conventional art: the FeCrCuTiV high-entropy alloy powder for laser melting deposition manufacturing and the preparation method thereof provided by the present disclosure, which utilize the solid solution effect of alloying elements such as Ti, V and Cu of the high-entropy alloy, can effectively alleviate the differences in thermal expansion coefficient, melting point, elastic modulus, etc. of the tungsten/steel or tungsten/copper heterogeneous interface, can reduce the residual stress level at the heterogeneous interface during the laser melting deposition manufacturing process and avoid the precipitation of Laves phase, and can meet the manufacturing requirements of tungsten/steel and tungsten/copper heterogeneous components for fusion reactors.

BRIEF DESCRIPTION

Some of the embodiments will be described in detail, with references to the following Figures, wherein like designations denote like members, wherein.

DETAILED DESCRIPTION

Figure 1:
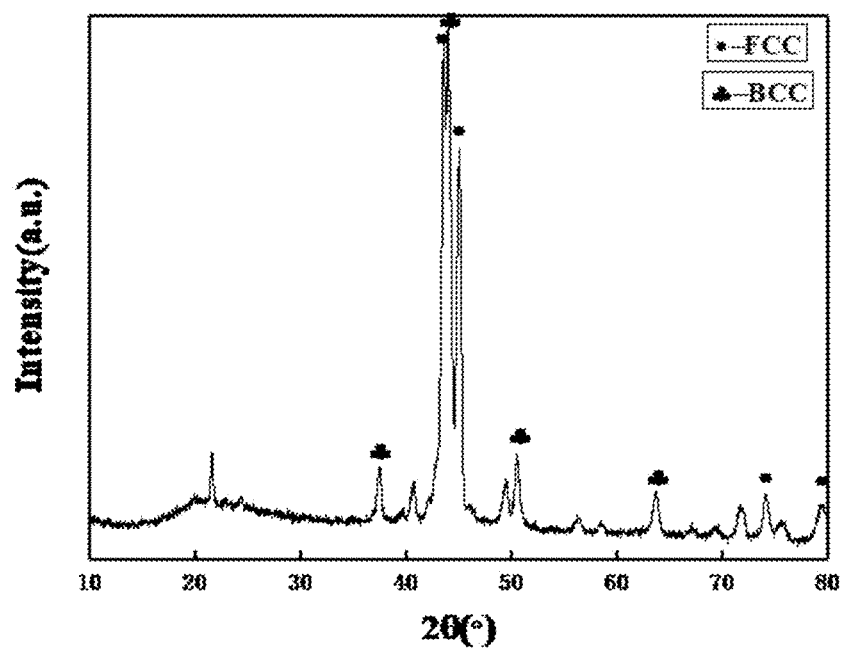
FIG. 1 shows an X-ray diffraction pattern of FeCrCuTiV high-entropy alloys obtained in Embodiment 1.

In the following, the technical solution of the present disclosure is further set forth.

The present disclosure provides a FeCrCuTiV high-entropy alloy powder for laser melting deposition manufacturing, in percent by weight, the composition of the high-entropy alloy powder is: chromium 17-20%; copper 22-25%; titanium 16-19%; vanadium 17-20%; rest is ferrum, which accounts for 19-22%.

The functions of each element in the FeCrCuTiV high-entropy alloy powder are as follows:

Chromium: to ensure corrosion resistance and high temperature oxidation resistance, and to improve mechanical properties;

Copper: to improve strength and toughness;

Titanium: to improve strength and toughness, and to improve hydrogen corrosion resistance under high temperature and high pressure;

Vanadium: to improve mechanical properties and high-temperature creep properties.

By utilizing the solid solution effect of alloying elements such as Ti, V and Cu of the high-entropy alloy, it can effectively alleviate the differences in thermal expansion coefficient, melting point, elastic modulus, etc. of the tungsten/steel or tungsten/copper heterogeneous interface, can reduce the residual stress level at the heterogeneous interface during the laser melting deposition manufacturing process and avoid the precipitation of Laves phase, and can meet the manufacturing requirements of tungsten/steel and tungsten/copper heterogeneous components for fusion reactors.

The present disclosure further provides a preparation method for the above-mentioned FeCrCuTiV high-entropy alloy powder for laser melting deposition manufacturing, comprising the following steps: preparing raw materials→melting→vacuum atomization→drying→screening, which is specifically as follows:

(1) Preparing raw materials:

Taking metal ferrum, metal chromium, metal copper, metal titanium and metal vanadium as raw materials, and preparing them according to a target composition;

(2) Melting:

(2.1) Adding the prepared metal ferrum, metal chromium, metal copper, metal titanium, and metal vanadium to a medium frequency induction furnace, and to be electrified heated to melt;

In this melting step, a part of the prepared raw materials is added to the medium frequency induction furnace for melting first, and rest of the prepared raw materials are added as a supplement to the alloy solution successively, and when adding the supplement, temperature inside the medium frequency induction furnace is controlled between 1500° C.-1550° C.;

(2.2) Discharging after adjusting the composition in the medium frequency induction furnace to be qualified, and discharging temperature of the alloy solution is 1450° C.-1500° C.;

(3) Vacuum atomization:

Atomizing the alloy solution obtained in Step (2), wherein the atomizing medium is argon, and atomizing pressure is 2-10 MPa;

(4) Drying:

Drying the alloy powder obtained by atomization in Step (3), and in this step, a far infrared dryer is used, and drying temperature is 200-250° C.;

(5) Screening:

Screening the alloy powder obtained by drying in Step (4) by a screening machine to screen out the alloy powder with particle size range of 100 mesh-350 mesh as final product, that is, the desired FeCrCuTiV high-entropy alloy powder.

The raw materials used in the present disclosure are not limited in the source, and are all commercial products.

Adopting Standard GB/T223 "Methods for chemical analysis of ferrum, steel and alloy", the composition of FeCrCuTiV high-entropy alloy powder prepared by the above preparation method is tested, and the test result is, in percent by weight, ferrum 19-22%, chromium 17-20%, copper 22-25%, titanium 16-19%, and vanadium 17-20%.

After cooling the above FeCrCuTiV high-entropy alloy powder to room temperature, a laser additive manufacturing method is used to manufacture parts with complex flow channel structures, the steps are as follows:

(1) Three-dimensional modeling, slicing using an image slice software, and at the same time, designing a forming path with a path planning software;

(2) Selecting different process parameters, analyzing the impact of the process on the structure and properties, proposing the best process parameters, and printing the parts according to the pre-established forming path;

(3) Performing post-treatments such as surface cleaning and stress relief annealing to obtain high-quality parts.

The following are the preferred embodiments:

Embodiment 1

The raw materials were prepared according to the following proportions, in percent by weight, comprising: chromium 19.2%, copper 22.3%, titanium 17.7%, vanadium 19.0%, and ferrum 21.8%.

The prepared metal ferrum, metal chromium, metal copper, metal titanium, and metal vanadium were added into a medium frequency induction furnace, and were electrified heated to melt, and the temperature inside the medium frequency induction furnace was controlled at 1520° C. It was discharged after adjusting the composition in the furnace to be qualified, and the discharging temperature of the alloy solution was 1460° C.

The alloy solution was atomized to product an alloy powder, the atomizing medium was argon, and the atomizing pressure was 4 MPa;

A far infrared dryer was used to dry the alloy powder after atomization treatment, and the drying temperature was 210° C. A screening machine was used to screen out the alloy powder with a particle size range of 100 mesh-350 mesh as final product.

After cooling the above final product to room temperature, a laser additive manufacturing method was used to manufacture parts with complex flow channel structures.

Embodiment 2

The raw materials were prepared according to the following proportions, in percent by weight, comprising: chromium 17.8%, copper 24.8%, titanium 18.7%, vanadium 19.4%, and ferrum 19.3%.

The prepared metal ferrum, metal chromium, metal copper, metal titanium, and metal vanadium were added into a medium frequency induction furnace, and were electrified heated to melt, and the temperature inside the medium frequency induction furnace was controlled at 1520° C. It was discharged after adjusting the composition in the furnace to be qualified, and the discharging temperature of the alloy solution was 1460° C.

The alloy solution was atomized to product an alloy powder, the atomizing medium was argon, and the atomizing pressure was 4 MPa;

A far infrared dryer was used to dry the alloy powder after atomization treatment, and the drying temperature was 210° C. A screening machine was used to screen out the alloy powder with a particle size range of 100 mesh-350 mesh as final product.

After cooling the above final product to room temperature, a laser additive manufacturing method was used to manufacture parts with complex flow channel structures.

The Vickers hardness test was performed on the FeCrCuTiV high-entropy alloy powders obtained in the above two embodiments, wherein the Vickers hardness test had a guaranteed time of 10 s and a test force of 200 g, and the test results are as follows:

| Vickers Hardness Test Results | | | | |
|---|---|---|---|---|
| | Measurement 1/ HV0.2 | Measurement 2/ HV0.2 | Measurement 3/ HV0.2 | Measurement/ HV0.2 |
| Embodiment 1 FeCrCuTiV-1 | 32.8 | 30.2 | 30.4 | 31.1 |
| Embodiment 2 FeCrCuTiV-2 | 37.6 | 37.2 | 38.3 | 37.7 |

The above Vickers hardness test results show that the hardness of the FeCrCuTiV high-entropy alloy obtained in the two embodiments is at a high level, and the Vickers hardness of the FeCrCuTiV high-entropy alloy with low copper content in Embodiment 1 is significantly lower than that of the FeCrCuTiV high-entropy alloy with high copper content in Embodiment 2.

The tensile test was performed on the FeCrCuTiV high-entropy alloy powders obtained in the above two embodiments, and the test results are as follows:

| Tensile Test Results | | |
|---|---|---|
| | Tensile Strength/Mpa | Break Elongation/% |
| Embodiment 1 FeCrCuTiV-1 | 610.3 | 13.2 |
| Embodiment 2 FeCrCuTiV-2 | 654.2 | 10.9 |

The above tensile test results show that the FeCrCuTiV high-entropy alloy obtained in the two embodiments are excellent in mechanical properties, and the tensile strength of the FeCrCuTiV high-entropy alloy with low copper content in Embodiment 1 is lower than that of the FeCrCuTiV high-entropy alloy with high copper content in Embodiment 2, while the break elongation of Embodiment 1 is greater than that of Embodiment 2.

Figure 2:
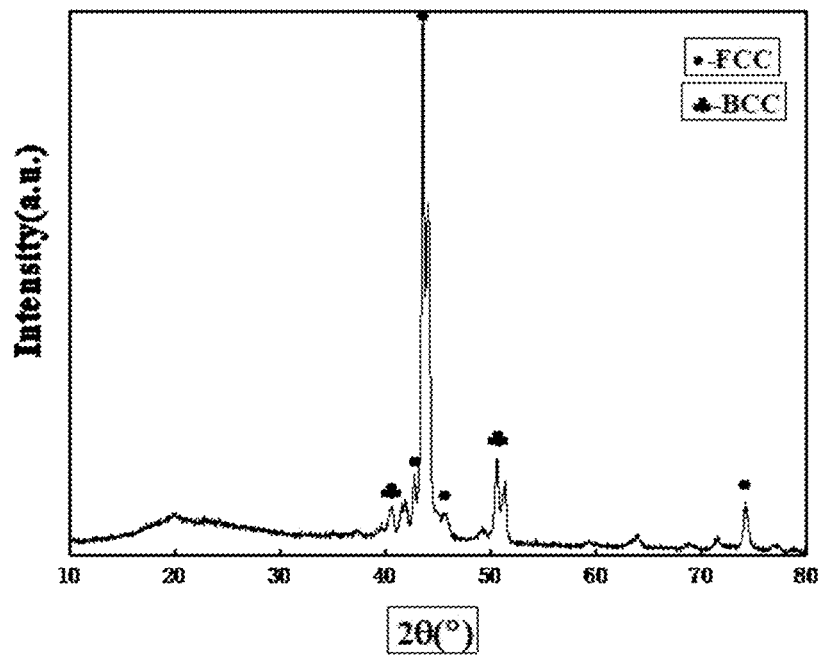
FIG. 2 shows an X-ray diffraction pattern of FeCrCuTiV high-entropy alloys obtained in Embodiment 2.

FIG. 1 is X-ray diffraction pattern of FeCrCuTiV high-entropy alloy obtained in Embodiment 1, and FIG. 2 is X-ray diffraction pattern of FeCrCuTiV high-entropy alloy obtained in Embodiment 2, and it can be seen from the figures that the alloy is a simple FCC+BCC structure, and no other complex phases are generated in the alloy.

Figure 3:
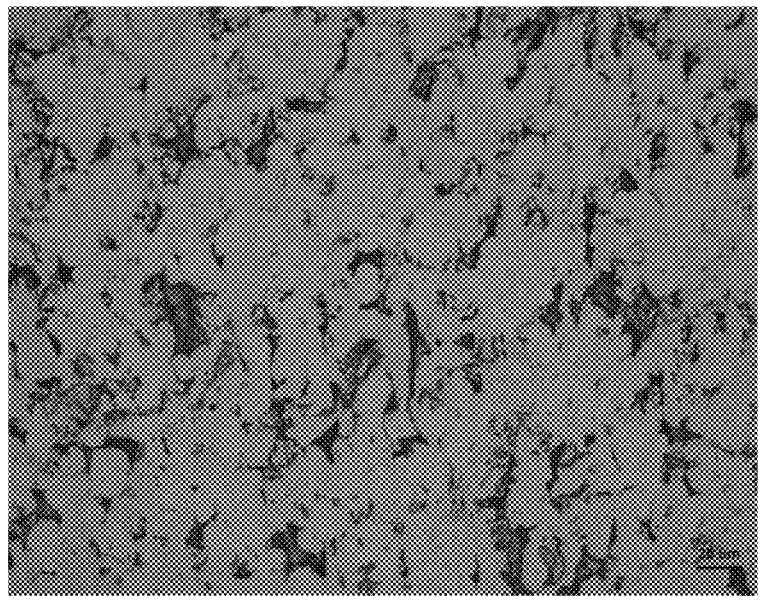
FIG. 3 is a metallurgical structure diagram of FeCrCuTiV high-entropy alloys obtained in Embodiment 1.
Figure 4:
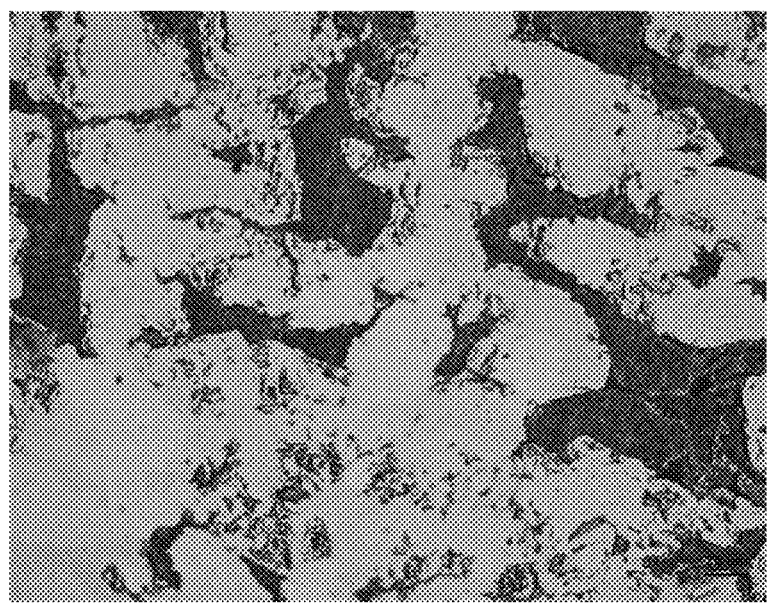
FIG. 4 is a metallurgical structure diagram of FeCrCuTiV high-entropy alloys obtained in Embodiment 2.
Figure 5:
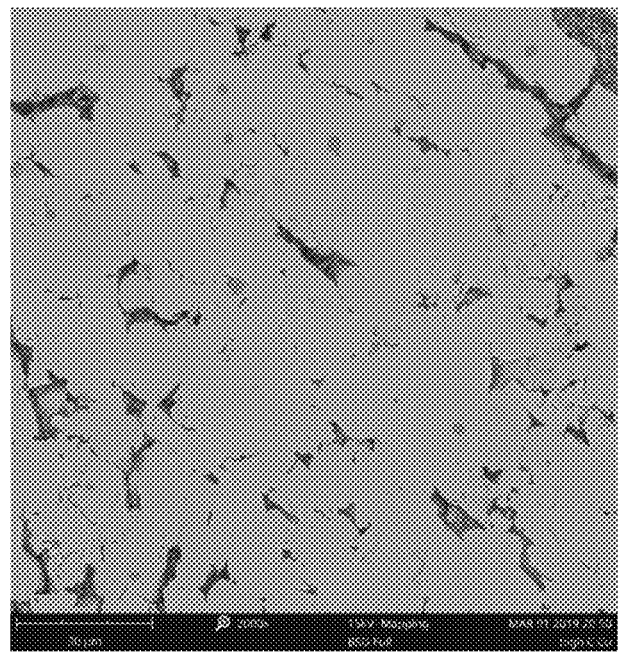
FIG. 5 is a scanning electron micrograph of FeCrCuTiV high-entropy alloys obtained in Embodiment 1.
Figure 6:
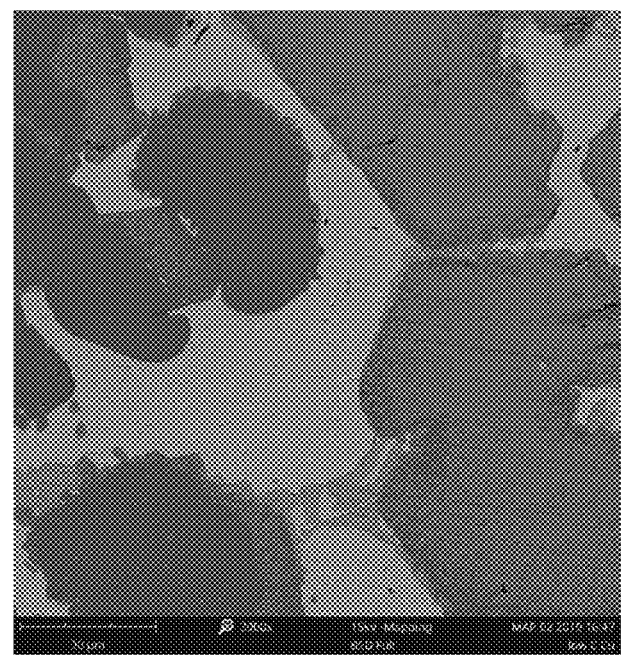
FIG. 6 is a scanning electron micrograph of FeCrCuTiV high-entropy alloys obtained in Embodiment 1.

FIG. 3 is metallurgical structure diagram of FeCrCuTiV high-entropy alloy obtained in Embodiment 1; and FIG. 4 is metallurgical structure diagram of FeCrCuTiV high-entropy alloy obtained in Embodiment 2, FIG. 5 is scanning electron micrograph of FeCrCuTiV high-entropy alloy obtained in Embodiment 1; and FIG. 6 is scanning electron micrograph of FeCrCuTiV high-entropy alloy obtained in Embodiment 2, and it can be seen from the figures that the FeCrCuTiV high-entropy alloy has large grains.

From the above, it can be seen that the FeCrCuTiV high-entropy alloy powder for laser melting deposition manufacturing provided by the present disclosure, has good comprehensive properties, which can reduce the residual stress level at the heterogeneous interface during the laser melting deposition manufacturing process and avoid the precipitation of Laves phase, and can meet the manufacturing requirements of tungsten/steel and tungsten/copper heterogeneous components for fusion reactors.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A preparation method of a FeCrCuTiV high-entropy alloy powder for laser melting deposition manufacturing, the preparation method comprising:
   (1) preparing raw materials consisting of: chromium 17-20%; copper 22-25%; titanium 16-19%; vanadium 17-20%; ferrum 19-22%, in percent by weight;
   (2) adding the raw materials to an induction furnace, to be electrified heated for melting to form an alloy solution, wherein the adding the raw materials includes adding a part of the raw materials into the induction furnace for melting to form the alloy solution and then adding rest of the raw materials to the alloy solution successively as supplement materials, further wherein, when adding the supplement materials into the induction furnace, a temperature inside the induction furnace is controlled between 1500° C.-1550° C.; discharging the alloy solution after confirming composition of the alloy solution in the induction furnace to be consistent with a proportion of the raw materials, wherein a discharging temperature of the alloy solution is 1450° C.-1500° C.;
   (3) vacuum atomizing the alloy solution obtained in Step (2) to form alloy powder, wherein an atomizing medium is argon, and an atomizing pressure is 2-10 MPa;
   (4) drying the alloy powder obtained in Step (3), wherein a drying temperature is 200-250° C.; and
   (5) screening the alloy powder obtained in Step (4) by a screening machine to screen out the alloy powder with a required particle size range.

2. The preparation method according to claim 1, wherein in percent by weight, the raw materials consisting ofcomprising chromium 19.2%, copper 22.3%, titanium 17.7%, vanadium 19.0%, and ferrum 21.8%.

3. The preparation method according to claim 1, wherein in percent by weight, the raw materials consisting ofcomprising chromium 17.8%, copper 24.8%, titanium 18.7%, vanadium 19.4%, and ferrum 19.3%.

4. The preparation method according to claim 1, wherein a particle size of the FeCrCuTiV high-entropy alloy powder obtained in Step (5) is 100 mesh-350 mesh.

* * * * *